United States Patent [19]

Kawazu et al.

[11] Patent Number: 4,739,148
[45] Date of Patent: Apr. 19, 1988

[54] APPARATUS FOR IMPROVING SURFACE QUALITY OF ROTARY MACHINE PARTS

[75] Inventors: Akinobu Kawazu; Atsushi Fukada; Susumu Hoshinouchi, all of Hyogo, Japan

[73] Assignee: Mitsubishi Denki Kabushiki Kaisha, Tokyo, Japan

[21] Appl. No.: 42,903

[22] Filed: Apr. 27, 1987

Related U.S. Application Data

[62] Division of Ser. No. 747,606, Jun. 21, 1985, Pat. No. 4,686,349.

[30] Foreign Application Priority Data

Jun. 22, 1984 [JP] Japan ................... 59-127295

[51] Int. Cl.⁴ .............................................. B23K 26/00
[52] U.S. Cl. ........................ 219/121 LM; 219/121 LR
[58] Field of Search .... 219/121 LM, 121 L, 121 LA, 219/121 LP, 121 LR, 121 LE, 121 LF

[56] References Cited

U.S. PATENT DOCUMENTS

| | | | |
|---|---|---|---|
| 3,941,973 | 3/1976 | Luck, Jr. et al. | 219/121 LH |
| 4,304,978 | 12/1981 | Saunders | 219/121 LM X |
| 4,475,027 | 10/1984 | Pressley | 219/121 LP X |

*Primary Examiner*—C. L. Albritton
*Attorney, Agent, or Firm*—Sughrue, Mion, Zinn, Macpeak, and Seas

[57] ABSTRACT

An apparatus for improving the surface quality of a rotary machine part in which a high density beam such as laser beam or electron beam is condensed with collimation to a parallelepiped spatial intensity distribution, the intensity being controllable. The beam is directed to a predetermined surface area of the rotary machine part rotating at a constant angular velocity. A solidified layer formed by rapid solidification of a surface portion of the rotary machine part, which is melted by irradiation by the condensed beam, and a transformation-hardened layer formed below the solidified layer are uniform in thickness, and the transformation-hardened layer is uniformly formed throughout the periphery of the rotary machine part, and thus no cracking and/or pitting occurs.

1 Claim, 6 Drawing Sheets

APPARATUS FOR IMPROVING SURFACE QUALITY OF ROTARY MACHINE PARTS

This is a division of application Ser. No. 747,606 filed June 21, 1985, now U.S. Pat. No. 4,686,349.

BACKGROUND OF THE INVENTION

The present invention relates to an apparatus for improving the surface quality of rotary machine parts, which apparatus employs as a heat source a high density beam such as a laser beam or electron beam and which is capable of providing a solidified layer formed by rapid solidification of a molten surface portion of a machine part and a transformation-hardened layer formed below the solidified layer without cracking or pitting.

FIG. 1 shows schematically a conventional surface improving apparatus for rotary machine parts, in which reference numeral 1 depicts a high density beam generator, 2 a high density beam obtained therefrom, 3 a condenser for condensing the beam, 4 a rotary machine part whose surface is to be improved, and 5 a positioning mechanism for positioning the rotary machine part 4 while rotating the latter.

The high density beam 2 from the beam generator 1 is condensed by the condenser 3 and directed onto a surface of the rotary machine part 4, which is rotated at a constant speed while being held at a designated position by the positioning mechanism 5.

FIG. 2 is a perspective view illustrating a spatial intensity distribution of the high density beam 2 condensed by the condenser 3 and directed onto the surface of the machine part 4. As is clear from FIG. 2, the spatial intensity distribution of the beam is substantially conical, the higher the intensity, the closer to the center of the beam.

FIG. 3 is a partially cross-sectioned side view of the rotary machine part 4, which may be a cam shaft whose cross section is noncircular and whose surface quality has been improved by the conventional apparatus shown in FIG. 1, and FIG. 4 is cross-section taken along a line IV—IV in FIG. 3. In these drawings, reference numeral 6 depicts solidified layers formed by rapidly solidified surface portions of the cam shaft 4 which are rendered molten by irradiation with the high density beam 2, 7 transformation-hardened layers formed below the solidified layers 6, and 8 a crack formed in the layer 6.

The reason for the presence of these layers is as follows. Since the spatial intensity distribution of the high density beam 2 takes the form of a Gaussian-type body of revolution, that is, a cone-like body as shown in FIG. 2, thicker portions of the layer 6 are produced, and hence portions of the layer 7 are closer the position of the center of the beam 2 than others, causing the surface quality of the machine part 4 to be nonuniform, as shown in FIG. 3. In order to make such a surface uniform in quality, it is usual to irradiate the solidified layer 6 again with the beam 2 to re-melt and re-solidify it. In such a case, however, there may be further a crack or cracks 8 produced in the layer 6.

Further, since the positioning mechanism 5 of the conventional apparatus rotates the machine part 4 at a constant speed, the speed of the beam 2 relative to the portions of the surface of the machine part 4 which are not circular in cross section is not constant. Therefore, the thicknesses of the respective layers 6 and 7 become more nonuniform as shown in FIG. 4.

FIG. 5 is a graph showing the power distribution of the high density beam 2 over time. That is, the power of the beam 2 is substantially constant for a certain period with sharp leading and trailing edges. The beam power is substantially zero at the times when the beam is cut off. With this power distribution, a pond of molten metal is formed at a point on the surface of the machine part 4 which corresponds to the center of the beam at the time when it is cut off. This pond becomes a pit 9 after solidification, as shown in FIG. 6, which is a plan view of the machine part 4 in FIG. 3. In order to remove such pits, it is necessary to perform re-melting by irradiating the part 4 with the beam. However, it is undesirable to do so for the reasons mentioned above.

Accordingly, it is substantially impossible to improve the surface quality of the machine part 4 without the formation of pits and/or cracks, resulting in poor mechanical characteristics, including low strength and durability.

SUMMARY OF THE INVENTION

An object of the present invention is thus to provide a surface quality improving apparatus for rotary machine parts with which a rapidly solidified layer and a transformation-hardened layer of a surface portion of the machine part are made uniform without pitting and/or cracking.

The above, as well as other objects of the invention, is met by an apparatus for improving the surface quality of a rotary machine part by irradiating a surface of the rotary machine part with a high density beam to obtain a rapidly solidified and transformation-hardened layer. In accordance with the invention, the high density beam is condensed in such a manner that a spatial intensity distribution thereof has a parallelepiped shape. The rotary machine part is positioned such that irradiation with the condensed beam is performed while rotating the part at a constant angular velocity.

DETAILED DESCRIPTION OF THE PREFERRED EMBODIMENTS

Figure 7:
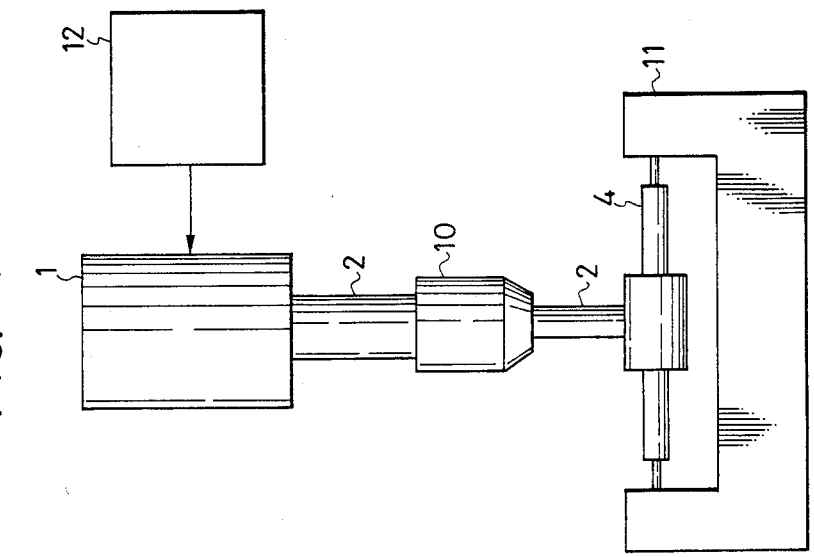
FIG. 7 shows in a schematic view a surface quality improving apparatus constructed according to a preferred embodiment of the present invention.

In FIG. 7, in which like or corresponding components in FIGS. 1 to 6 are indicated by like reference numerals, reference numeral 10 depicts a condenser for condensing the high density beam 2 produced by the beam generator 1 in such a manner that the spatial intensity distribution thereof is parallelepiped in shape, 11 a positioning mechanism for positioning the high density beam 2 at an irradiation point while rotating a machine part 4 at a constant peripheral speed, and 12 an output control mechanism for controlling the output power of the high density beam in a manner to be described.

Figure 8:
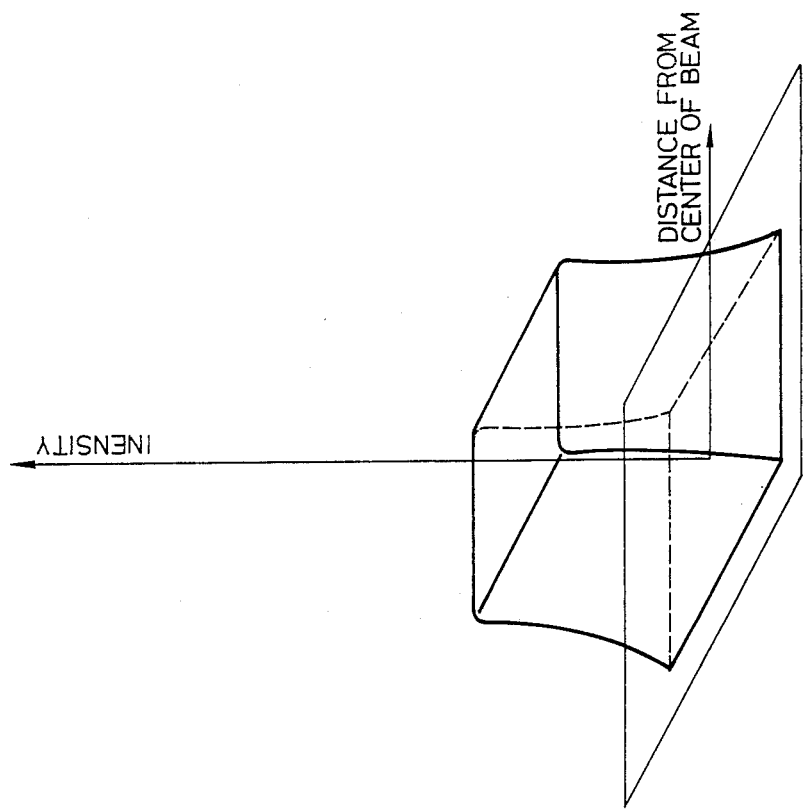
FIG. 8 depicts the intensity distribution of a high density beam produced by the apparatus in FIG. 7.

The high density beam 2 produced by the beam generator 1 is condensed by the condenser 3 so that its spatial intensity distribution becomes parallelepiped in shape, as shown in FIG. 8, and the height of the parallelepiped distribution is controlled by the output control mechanism 12 connected to the beam generator 1 according to machining conditions desired for the rotary machine part 4, which is assumed to have a noncircular cross section.

The condenser 3 may include a suitable lens system, a shield plate made of a material opaque to the beam and which is formed with a rectangular window and a suitable filtering device and/or a suitable reflection device disposed in the window to provide the parallelepiped spatial intensity distribution.

The rotational speed of the machine part 4 mounted on the positioning mechanism 11 is controlled such that the surface speed of the machine part 4 relative to the beam 2 is constant.

Figure 9:
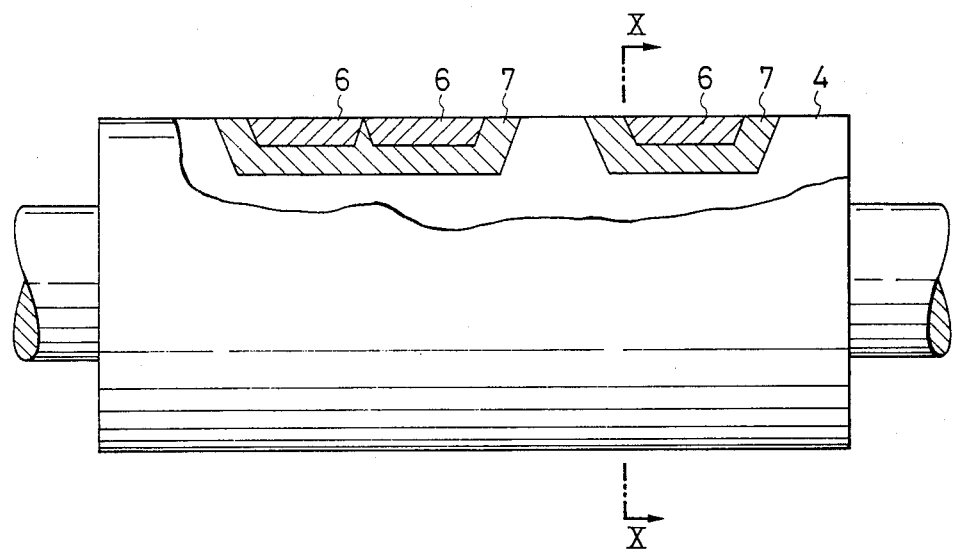
FIG. 9 is a partial cross-sectional view of a machine part whose surface quality is improved by the apparatus of FIG. 7.
Figure 10:
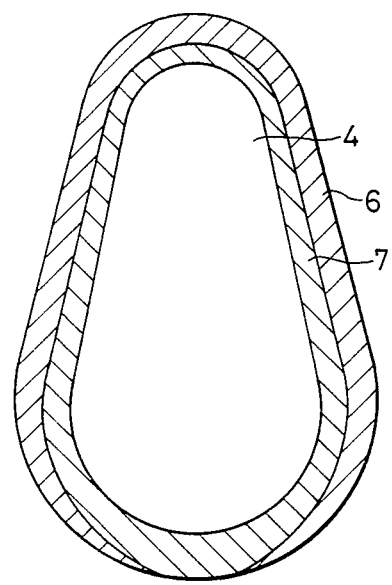
FIG. 10 is a cross-sectional view taken along a line X—X in FIG. 9.
Figure 11:
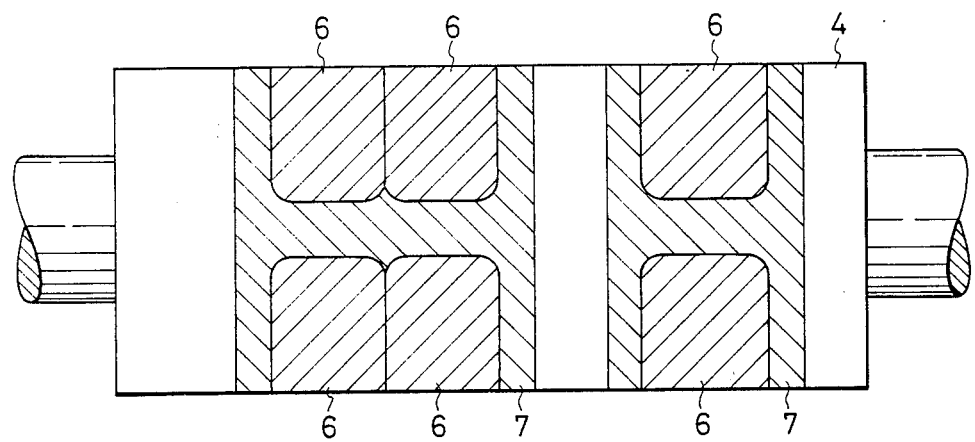
FIG. 11 is a plan view of the machine part of FIG. 9.

FIG. 9 is a partially cross-sectional view of a rotary machine part 4 whose surface quality is improved by the present invention, FIG. 10 is a cross section taken along a line X—X in FIG. 9, and FIG. 11 is a plan view of the rotary machine 4 of FIG. 9.

Figure 2:
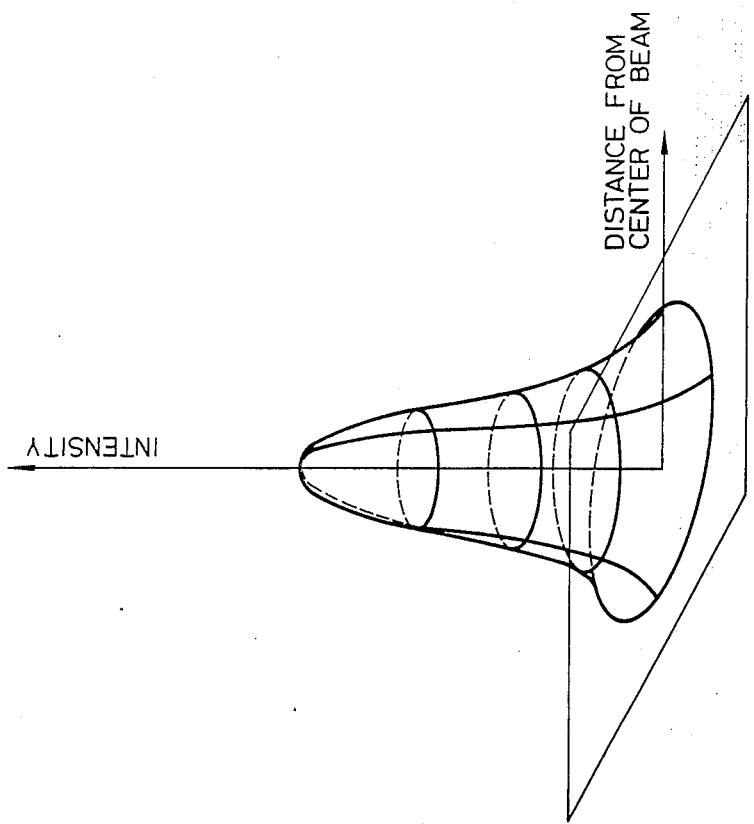
FIG. 2 shows the intensity destribution of a high density beam produced by the conventional apparatus.
Figure 1:
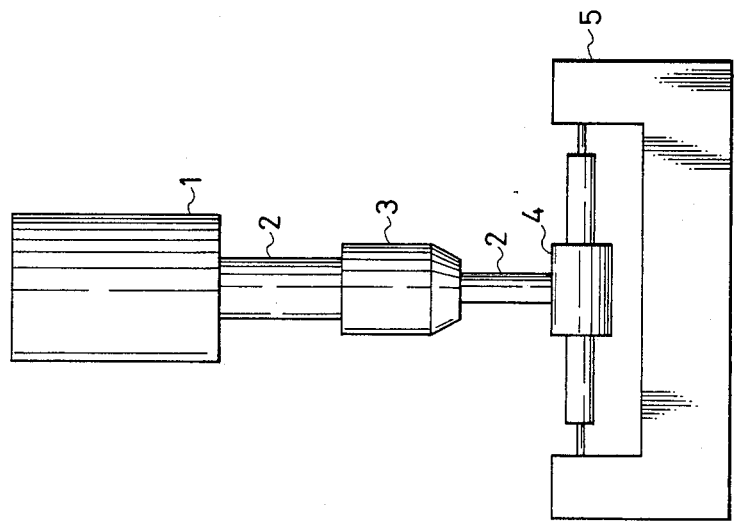
FIG. 1 shows schematically a structure of a conventional apparatus for improving the surface quality of rotary machine parts.
Figure 3:
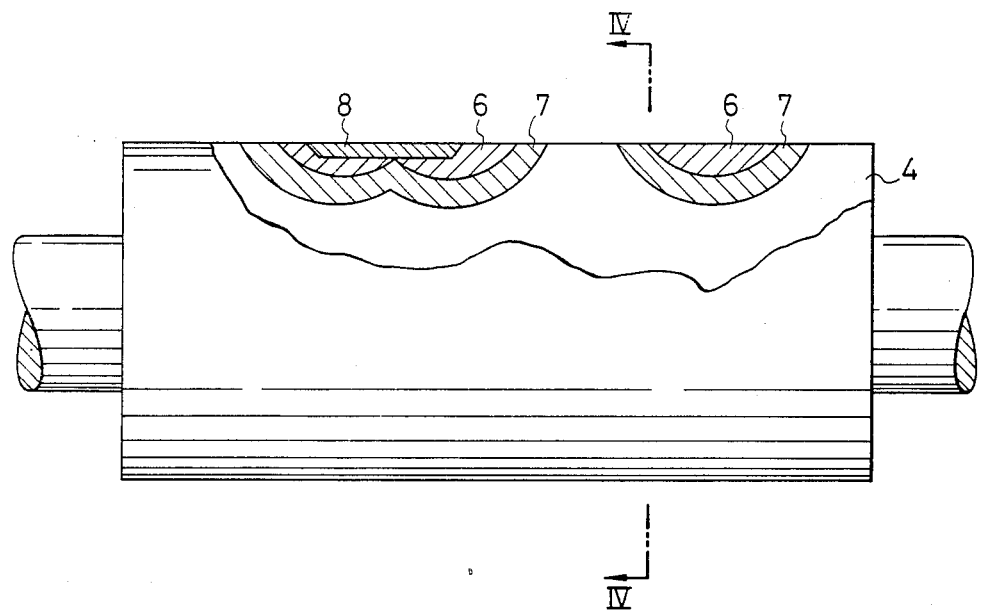
FIG. 3 is a partially cross-sectional view of a machine part whose surface quality is improved by the conventional apparatus.
Figure 4:
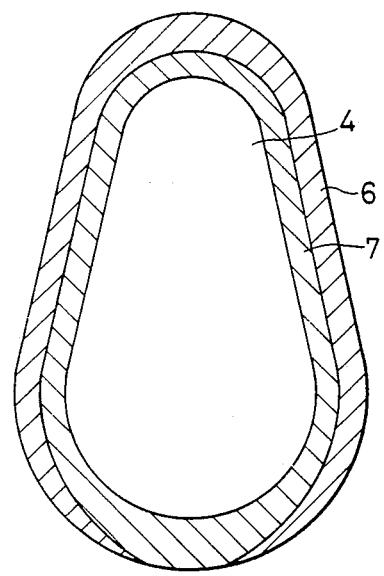
FIG. 4 is a cross-section taken along a line IV—IV in FIG. 3.
Figure 5:
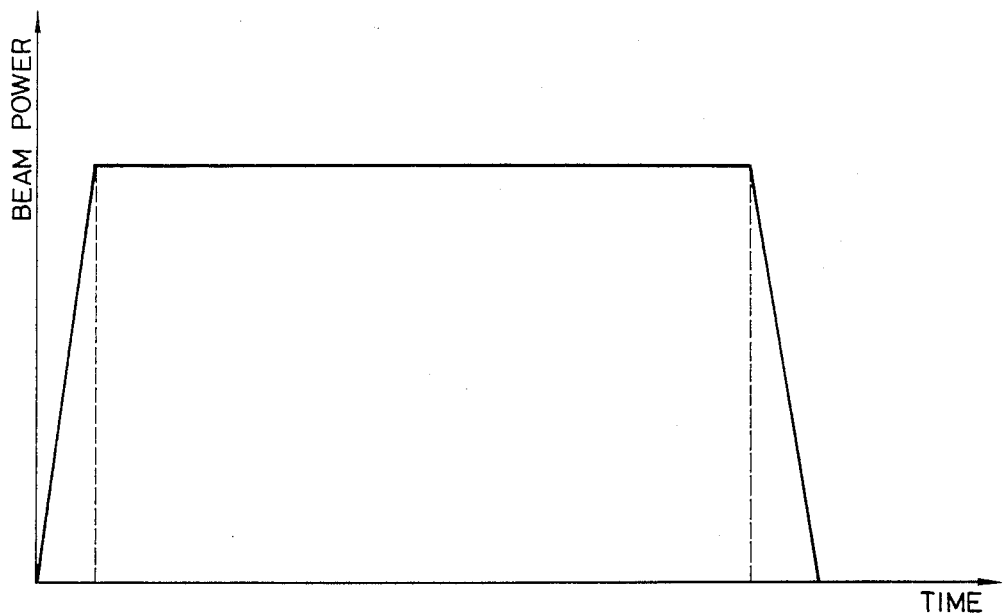
FIG. 5 shows an intensity variation of a high density beam with time.
Figure 6:
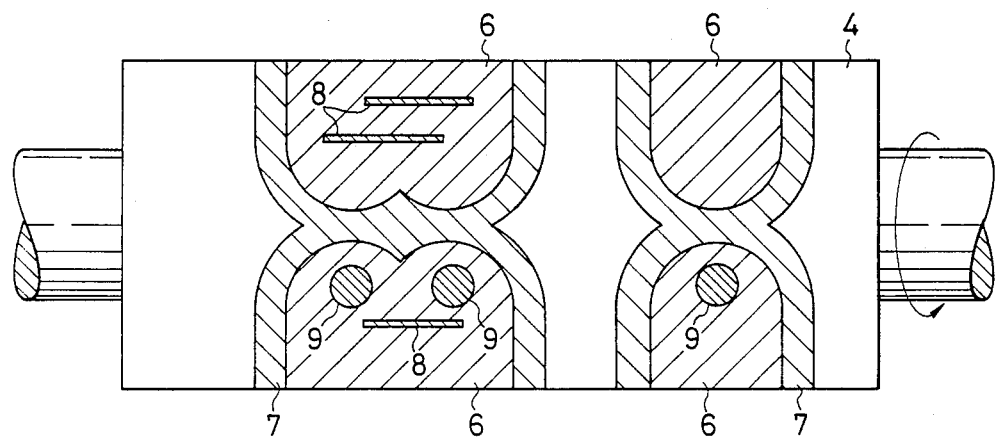
FIG. 6 is a plan view of the machine part in FIG. 3.

As is clear from FIGS. 9 and 10, the thicknesses of the solidified layer 6 and the transformation-hardened layer 7 are very uniform, compared with those shown in FIGS. 3 and 4, and thus there is no need of melting the solidified layer 6 again, resulting in no cracking. When the width of a surface area whose quality is to be improved is wider than the width of the high density beam, it is advisable to irradiate that surface with the beam repeatedly in a parallel pattern without edges of adjacent solidified layers overlapping, as shown in FIGS. 9 and 11, resulting in a hardened layer having no axial cracks.

Figure 12:
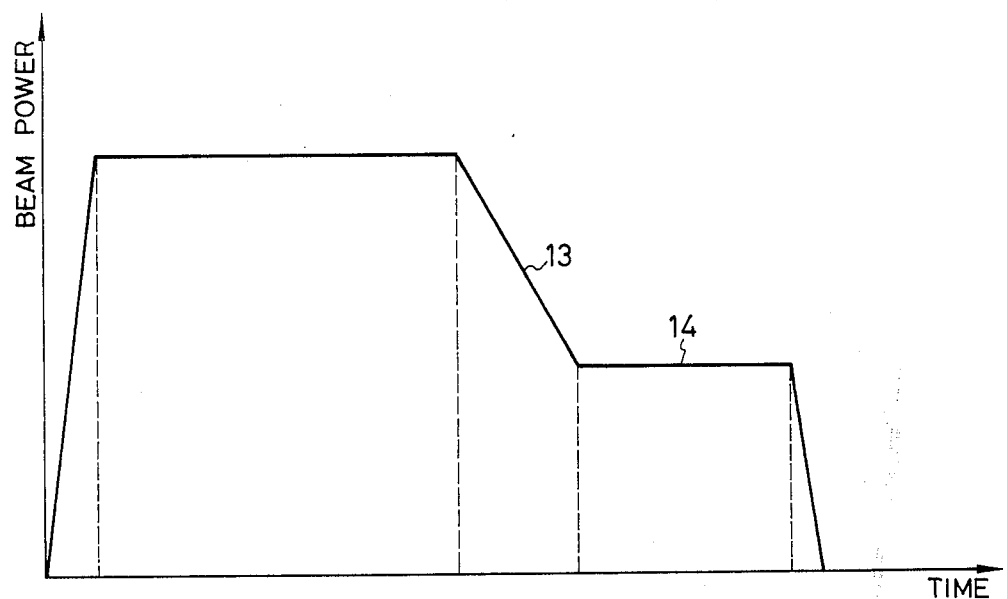
FIG. 12 shows the intensity variation over time of a beam having the distribution of FIG. 8.

FIG. 12 is a graph showing a typical power variation of the high density beam 2 over time when the surface of the rotary machine part 4 is improved using the present apparatus. In a time segment 13, the power is reduced gradually so as to remove any pits, and, in a time segment 14, the power is held constant so as not to melt the surface portion of the rotary machine part 4 but to effect transformation-hardening thereof. With such a power variation, there is no pond produced at points at which irradiation is terminated, as shown in FIG. 11, and thus there is no pitting produced thereby.

With the provision of the lower power time segment portion 14, it is possible to produce only the transformation-hardened layer without re-melting portions of the solidified layer where the irradiation started. Therefore, the resultant solidified layer 6 and the hardened layer 7 are as shown in FIG. 10. That is, the thickness of the hardened layer 7 is uniform throughout, with the merit of preventing formation of cracks and/or pits, resulting in a rotary machine part having a surface which is mechanically superior.

We claim:

1. In a method for improving the surface quality of a rotary machine part including the steps of irradiating a surface of the rotary machine part with a high density beam while rotating said part about an axis at a constant angular velocity, condensing the high density beam irradiating said surface and controlling the intensity of said beam, the improvement wherein said step of condensing said high density beam comprises condensing said high density beam so as to form a spatial intensity distribution thereof having a parallelepiped shape and said method further comprises collimating said high density beam to rectangular form in cross-section and causing the density of the beam to be uniform such that the surface quality of the rotary machine part has a rapidly solidified layer and a transformation-hardened layer on a surface portion thereof which is uniform, without pitting and/or cracking.

* * * * *